US 7,182,065 B2

(12) United States Patent
Andersen et al.

(10) Patent No.: US 7,182,065 B2
(45) Date of Patent: Feb. 27, 2007

(54) VEHICLE AND METHOD FOR OPERATING AN ENGINE IN A VEHICLE

(75) Inventors: Erik Andersen, Wixom, MI (US); Chris Kapolnek, Dearborn, MI (US); David Liller, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 10/710,703

(22) Filed: Jul. 29, 2004

(65) Prior Publication Data

US 2006/0021807 A1 Feb. 2, 2006

(51) Int. Cl.
*F02D 41/14* (2006.01)

(52) U.S. Cl. .......................... 123/352; 123/436
(58) Field of Classification Search ................ 123/350, 123/352, 435–436, 492–493, 2–3
See application file for complete search history.

(56) References Cited

U.S. PATENT DOCUMENTS

| | | | |
|---|---|---|---|
| 4,197,767 A | 4/1980 | Leung | |
| 4,520,784 A | 6/1985 | Isobe et al. | |
| 4,697,561 A | 10/1987 | Citron | |
| 5,327,992 A | 7/1994 | Boll | |
| 5,474,052 A | 12/1995 | Aquino et al. | |
| 5,862,497 A | 1/1999 | Yano et al. | |
| 6,122,588 A * | 9/2000 | Shehan et al. | 701/93 |
| 6,278,915 B1 * | 8/2001 | Deguchi et al. | 701/22 |
| 6,321,157 B1 | 11/2001 | Sun et al. | |
| 6,327,852 B1 | 12/2001 | Hirose | |
| 6,425,373 B1 | 7/2002 | Robichaux et al. | |
| 6,657,315 B1 | 12/2003 | Peters et al. | |
| 6,662,096 B2 * | 12/2003 | Komiyama et al. | 701/54 |
| 6,823,840 B1 * | 11/2004 | Tamai et al. | 123/352 |
| 2002/0174852 A1 | 11/2002 | Choi | |
| 2006/0102393 A1 * | 5/2006 | Tumback et al. | 180/65.2 |

FOREIGN PATENT DOCUMENTS

| EP | 0556942 | * | 8/1993 |
|---|---|---|---|
| JP | 1313641 | | 12/1989 |
| JP | 9303179 | | 11/1997 |

* cited by examiner

*Primary Examiner*—Hai Huynh
(74) *Attorney, Agent, or Firm*—David B. Kelley; Brooks & Kushman

(57) ABSTRACT

A method for selectively adjusting an amount of fuel to an engine in a vehicle is provided. The vehicle includes an electric machine operatively connected to the engine and capable of controlling a speed of the engine. The method includes providing an amount of fuel to the engine based at least in part on a desired output of the engine, which is based at least in part on a driver input. The electric machine is commanded to control the engine speed based at least in part on the driver input. An output error of the engine is determined based at least in part on the command to the electric machine. The amount of fuel provided to the engine is adjusted when at least one predetermined condition is met, including the output error of the engine being greater than a predetermined amount.

27 Claims, 3 Drawing Sheets

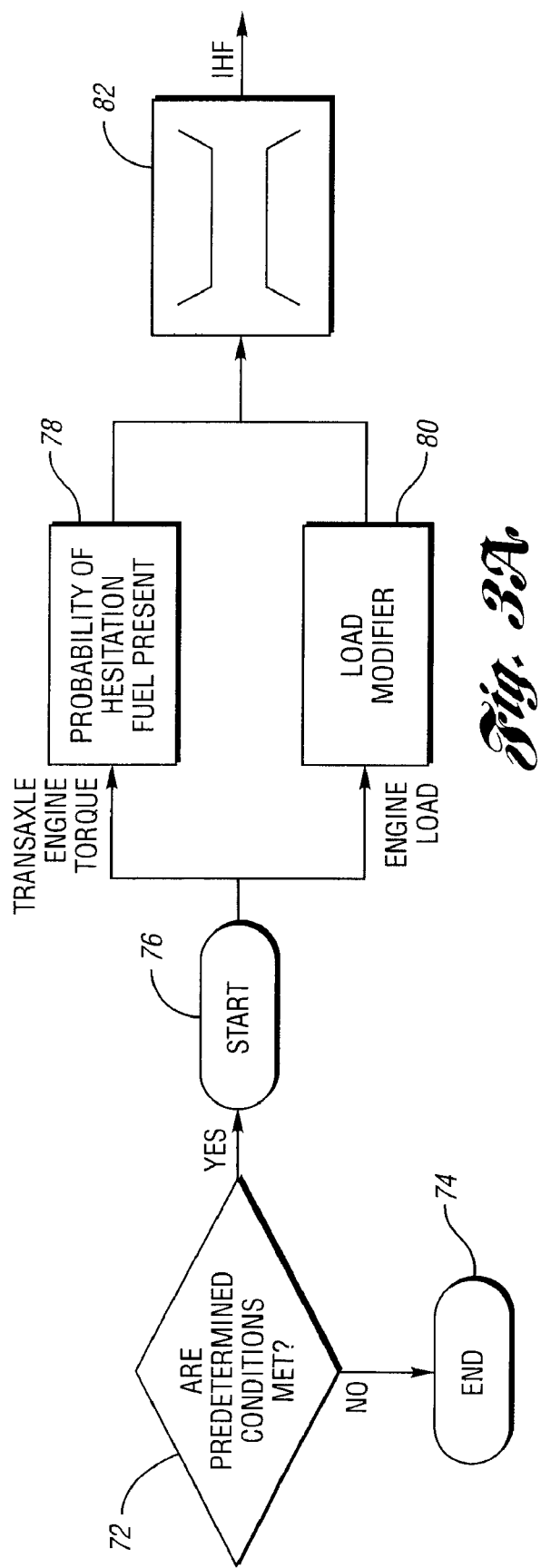
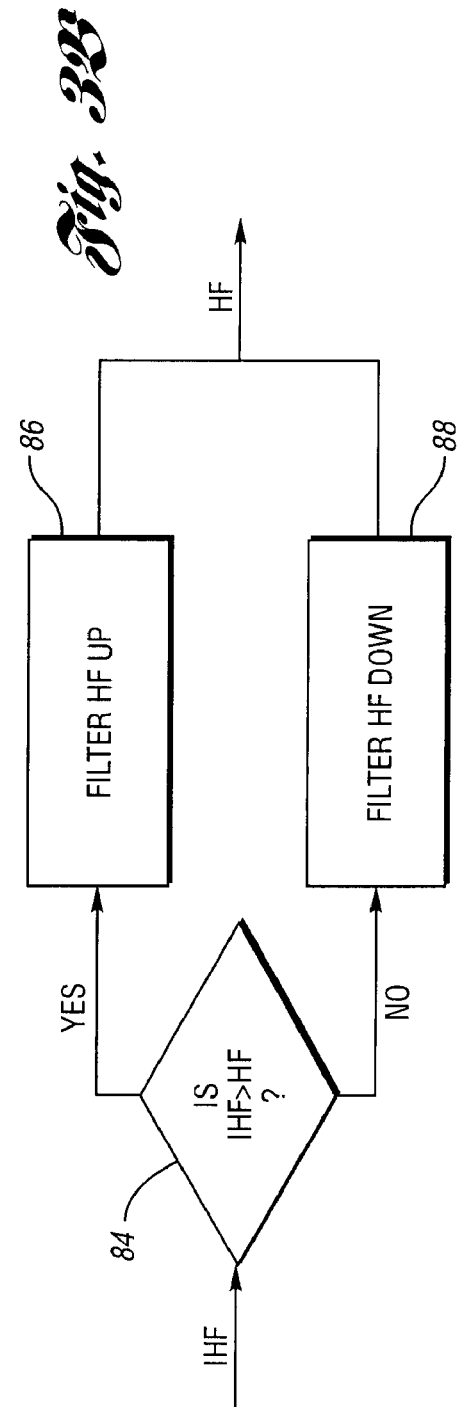

VEHICLE AND METHOD FOR OPERATING AN ENGINE IN A VEHICLE

BACKGROUND OF INVENTION

1. Field of the Invention

The present invention relates to a vehicle and a method for operating an engine in a vehicle.

2. Background Art

In an effort to reduce tail pipe emissions from vehicles, a variety of vehicle systems have, over the years, been modified and improved. For example, the ignition timing in a spark ignition engine may be adjusted based on various vehicle conditions to provide efficient combustion and reduced tail pipe emissions. Similarly, the timing of fuel injected into the cylinders in a diesel engine can also be controlled in an attempt to optimize combustion and reduce tail pipe emissions. In addition, the air-to-fuel ratio (A/F), and in particular the amount of fuel provided to the engine, may be controlled to reduce tail pipe emissions.

Controlling the A/F can be accomplished using a closed loop control system, such that after the air/fuel mixture is combusted, the exhaust gases are analyzed to determine adjustments to the A/F. Japanese Patent No. JP1313641 describes a system that uses an oxygen sensor to sense the $O_2$ concentration in the exhaust gas, and then uses this information as a feedback to control the A/F. One limitation of such a closed loop system is that it may not provide accurate information immediately following engine startup. Thus, until the engine has run for a certain amount of time and/or has achieved a certain temperature, it may be necessary to control the A/F with an open loop system. As used in this context, an open loop system is one that does not analyze the exhaust gases as part of a feedback control to adjust the A/F on the front end.

One alternative to using a closed loop system to control the A/F is to use one or more engine parameters that can be determined even if the engine is cold and/or in a transient startup state. For example, the engine speed, as measured by the crankshaft angle over time, may be used to help control the A/F for the engine. In a conventional vehicle, crankshaft position measurements may be one of only a few ways to determine the output of an engine, and thereby provide some basis for controlling the A/F for the engine. In non-conventional vehicles, however, such as hybrid electric vehicles (HEV), measuring the engine crankshaft angle over time may not be necessary to determine the engine output. Moreover, it does not take advantage of the interaction between the engine and an electric machine, such as a generator or a motor, which is a hallmark of HEV's.

Therefore, a need exists for a method for operating an engine in a hybrid electric vehicle to improve engine performance and reduce emissions, wherein the method utilizes the interaction between the engine and an electric machine in the vehicle.

SUMMARY OF INVENTION

One advantage of the present invention is that it provides a method for operating an engine in an HEV, which improves engine performance and reduces emissions, while taking advantage of the interaction between the engine and an electric machine in the vehicle.

The invention also provides a method for operating an engine in a vehicle. The vehicle includes an electric machine which is operatively connected to the engine and capable of controlling a speed of the engine. The method includes providing an amount of fuel to the engine based at least in part on a desired output of the engine. The electric machine is commanded to control the engine speed based at least in part on the desired engine output. An output error of the engine is determined based at least in part on the command to the electric machine. The engine output error is defined as a difference between the desired engine output and a determined engine output. At least one engine parameter is adjusted to reduce the engine output error when at least one predetermined condition is met.

The invention further provides a method for operating an engine in a vehicle. The vehicle includes an electric machine operatively connected to the engine and capable of controlling a speed of the engine. The method includes determining a desired torque for the engine based at least in part on a driver input. An amount of fuel to the engine is provided based at least in part on the desired torque. A desired speed for the engine is determined based at least in part on the driver input. The electric machine is commanded to control the speed of the engine based at least in part on the desired speed. It is determined whether at least one predetermined vehicle condition is met. A torque for the engine is determined based at least in part on the command to the electric machine. A torque error is determined; the torque error is defined as a difference between the desired torque and the determined torque. An amount of fuel provided to the engine is adjusted when the torque error is greater than a predetermined amount, and when the at least one predetermined condition is met.

The invention also provides a vehicle having an engine and a control system for operating the engine. The vehicle includes an electric machine operatively connected to the engine and capable of controlling a speed of the engine. At least one controller is configured to determine a desired output of the engine, and provide an amount of fuel to the engine based at least in part on the desired engine output. The at least one controller is further configured to command the electric machine to control the engine speed based at least in part on the desired engine output, determine an output error of the engine based at least in part on the command to the electric machine, and adjust at least one engine parameter to reduce the engine output error when at least one predetermined condition is met.

BRIEF DESCRIPTION OF DRAWINGS

FIGS. 3A and 3B are schematic diagrams illustrating a method of the present invention used to adjust fuel to an engine during a transient startup state.

DETAILED DESCRIPTION

Figure 1:
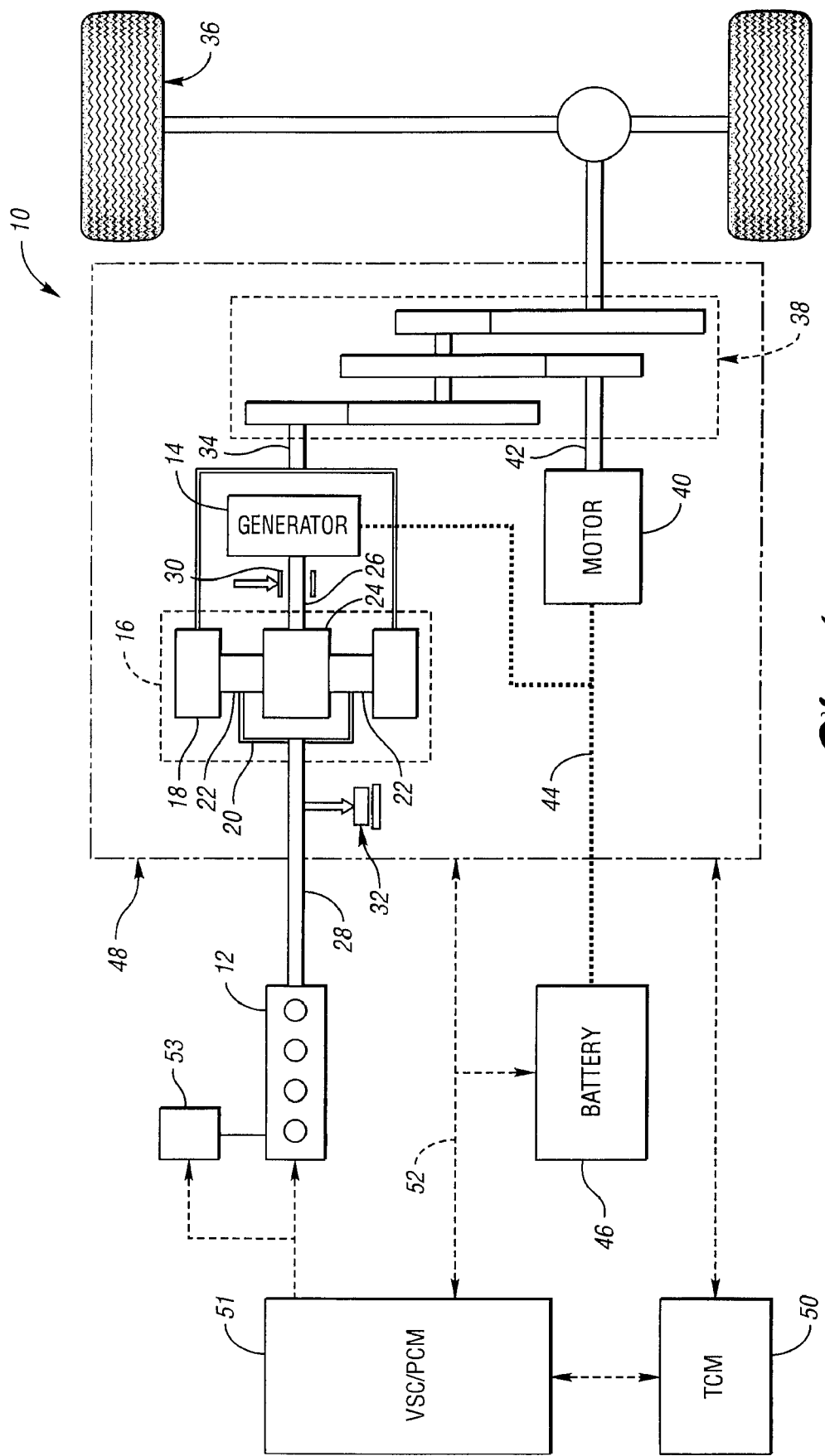
FIG. 1 is a schematic representation of a portion of a vehicle in accordance with the present invention.

FIG. 1 shows a schematic representation of a vehicle 10 in accordance with the present invention. The vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions, may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a shaft 28 connected to the carrier 20. A brake 30 is provided for stopping rotation of the shaft 26, thereby locking the sun gear 24 in place. Because this configuration allows torque to be transferred from the generator 14 to the engine 12, a one-way clutch 32 is provided so that the shaft 28 rotates in only one direction. As explained more fully below, having the generator 14 operatively connected to the engine 12, as shown in FIG. 1, allows the speed of the engine 12 to be controlled by the generator 14.

The ring gear 18 is connected to a shaft 34, which is connected to vehicle drive wheels 36 through a second gear set 38. The vehicle 10 includes a second electric machine, or motor 40, which can be used to output torque to a shaft 42. Other vehicles within the scope of the present invention may have different electric machine arrangements, such as more or less than two electric machines. In the embodiment shown in FIG. 1, the motor 40 and the generator 14 can both be used as motors to output torque. Alternatively, each can also be used as a generator, outputting electrical power to a high voltage bus 44 and to an energy storage device, or battery 46.

The battery 46 is a high voltage battery that is capable of outputting electrical power to operate the motor 40 and the generator 14. Other types of energy storage devices and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear set 16, and a portion of the second gear set 38 may generally be referred to as a transaxle 48. To control the components of the transaxle 48—i.e., the generator 14 and motor 40—a controller, or transaxle control module (TCM) 50, is provided. In addition to the TCM 50, the vehicle 10 also includes a second controller, which is a combination vehicle system controller and powertrain control module (VSC/PCM) 51. The VSC/PCM 51 communicates with the TCM 50 and the engine 12, and also communicates with the transaxle 48 and the battery 46 through a controller area network (CAN) 52. Although the VSC/PCM 51 is shown as a single, integrated controller, the VSC and PCM could be contained in separate controllers. In addition, other controllers, such as the TCM 50, could be integrated into the VSC/PCM 51, so that the functions of each of the controllers shown in FIG. 1 were carried out by a single hardware device.

The various devices controlled by the VSC/PCM 51 may include their own controllers. For example, an engine control unit (ECU) may communicate with the VSC/PCM 51 and may perform control functions on the engine 12. Similarly, the battery 46 may have a battery control module (BCM) that sends and receives signals to and from the VSC/PCM 51 and the battery 46. The transaxle 48 may also include one or more controllers configured to control specific components within the transaxle 48, such as the generator 14 and/or the motor 40. Such controllers could communicate with both the TCM 50 and the VSC/PCM 51 via the CAN 52.

As discussed above, the generator 14 is configured to control the speed of the engine 12—i.e., the engine 12 is operated in a speed control mode. As the engine 12 operates, its speed may be monitored by one or more speed sensors (not shown), such that the generator 14 can provide positive or negative torque through the planetary gear set 16 to maintain the speed of the engine 12 approximately constant. The relationship between the generator 14 and the engine 12 provides a mechanism for adjusting the amount of fuel to the engine 12 in accordance with the present invention.

As the vehicle 10 is operated, a number of inputs, including driver inputs, are received by the VSC/PCM 51. For example, an accelerator pedal position and/or a brake pedal position may be monitored, and signals sent to the VSC/PCM 51 to determine desired vehicle outputs. The accelerator pedal position is related to the position of a throttle 53, which regulates air flow into the engine 12. The VSC/PCM 51 can break down the desired vehicle output into device-specific signals that can be used to command the various devices and/or communicate with other controllers. For example, based on the desired vehicle output, the VSC/PCM 51 can calculate a desired engine torque, which can be sent directly to the engine 12, or to an intermediate controller, such as an ECU (not shown). Similarly, the VSC/PCM 51, based at least in part on the driver inputs, can calculate a desired engine speed, and can communicate it to the TCM 50. The TCM 50 can then provide a command to the generator 14 to control the speed of the engine 12.

Figure 2:
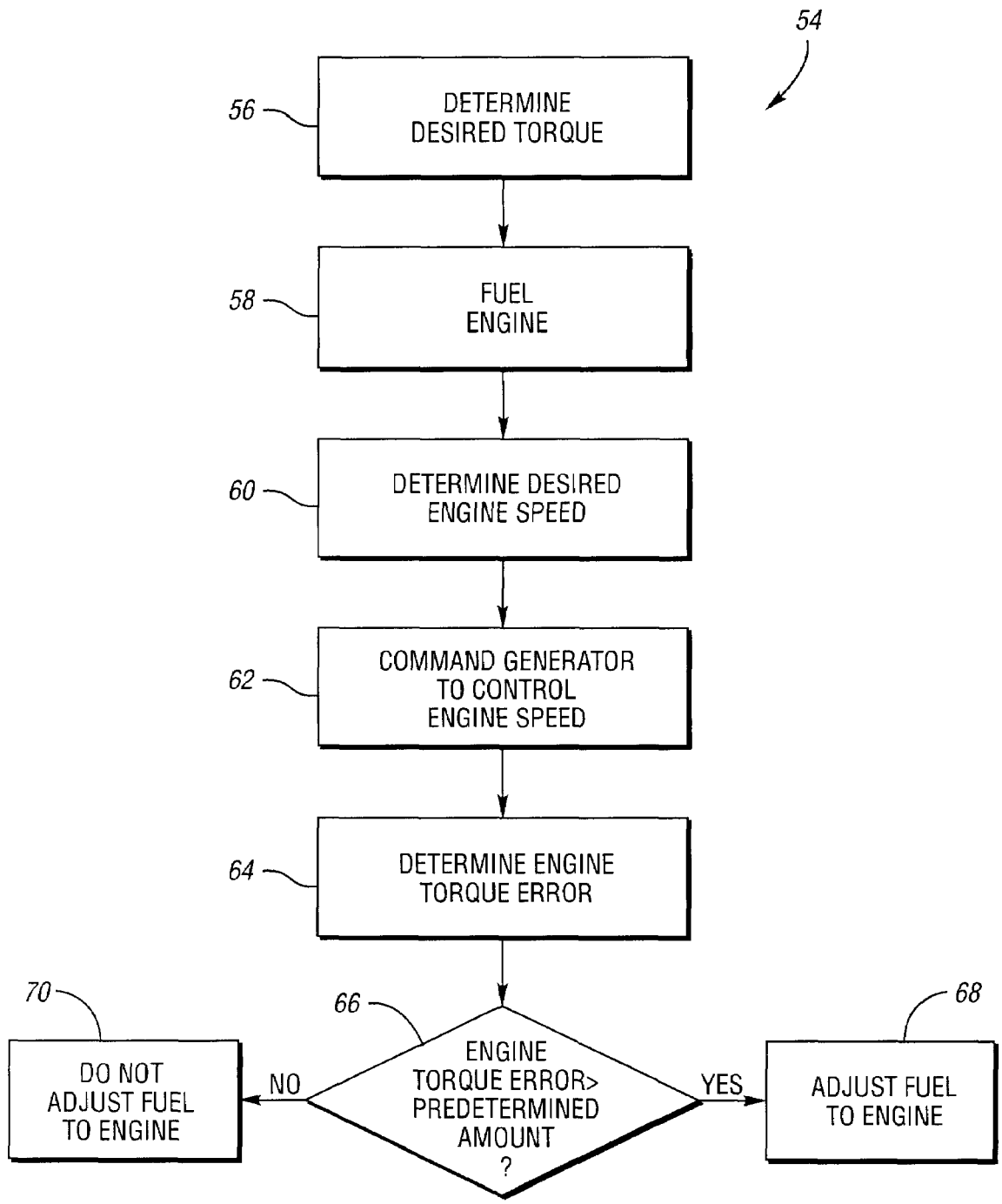
FIG. 2 is a flow chart illustrating a method of the present invention.

FIG. 2 shows a flow chart 54 illustrating the steps of a method in accordance with the present invention. Throughout the discussion of the method, the vehicle 10 and its components, shown in FIG. 1, are used for reference. At step 56, a desired torque for the engine 12 is determined based at least in part on a driver input. As discussed above, the driver input is received by the VSC/PCM 51, which calculates the desired torque for the engine. At step 58, an amount of fuel is provided to the engine 12 based on the desired torque. The VSC/PCM 51 may itself control the fuel flow to the engine 12, or as noted above, a separate controller, such as an ECU, may receive a signal from the VSC/PCM 51 to control the fuel flow to the engine 12. In addition to determining a desired engine torque, the VSC/PCM 51 also determines a desired engine speed, and communicates this to the TCM 50—see step 60. The TCM 50 then provides a command to the generator 14 to control the speed of the engine 12 based on the desired speed—see step 62. To control the speed of the engine 12, the generator 14 provides positive or negative torque to the engine 12 through the planetary gear set 16.

Based on the amount of torque provided by the generator 14 to the engine 12, an engine torque error is determined—see step 64. The engine torque error is defined as the difference between the desired engine torque and a determined engine torque. The determined engine torque and the engine torque error are related values, and both are based on the command to the generator 14. For example, if the TCM 50 must command the generator 14 to provide 10 Newton meters (Nm) of torque to the engine 12 to maintain the engine speed, the engine torque error is 10 Nm. Similarly, if the VSC/PCM 51 commanded the engine 12 to output 150 Nm of torque, and the generator 14 had to provide 10 Nm of torque to maintain the engine speed, the determined engine torque would be 140 Nm. Thus, either the determined engine torque, the engine torque error, or both may be calculated based on the command to the generator 14.

At decision block 66, it is determined whether the engine torque error is greater than a predetermined amount. If the answer is yes, a parameter of the engine 12, in this embodiment the amount of fuel provided to the engine 12, is adjusted—see step 68. Conversely, if the engine torque error is not greater than a predetermined amount, the amount of fuel provided to the engine 12 is not adjusted—see step 70.

Although the various steps in the flow chart 54 are shown sequentially, in actual practice, some or all of these steps may be performed in a different order, including concurrently. Moreover, it is contemplated that the method illustrated in FIG. 2 will be performed repeatedly to account for varying vehicle conditions.

It is worth noting that the engine parameter adjustment is not limited to adjusting the amount of fuel to the engine. For example, if the engine 12 is a spark ignition engine, the engine parameter can be an ignition timing. Similarly, if the engine 12 is a diesel engine, the engine parameter can be a fuel injection timing. Moreover, the method illustrated in FIG. 2 can be used to adjust more than one engine parameter, such as adjusting both the amount of fuel provided to the engine 12 and the spark timing.

Because the various components of the vehicle 10 communicate via the CAN 52, the method shown in FIG. 2 may be programmed into one or more of the controllers, such as the VSC/PCM 51 and/or the TCM 50. In addition to the steps shown in FIG. 2, a controller, such as the VSC/PCM 51, may be programmed with additional steps to provide even greater functionality. For example, at decision block 66, additional criteria may be used to determine whether to adjust the fuel to the engine 12. Thus, it may be desirable to use the method shown in FIG. 2 when certain vehicle conditions exist, and to use a different method when other vehicle conditions exist. In addition to the engine torque error determination, the decision block 66 may contain any number of other vehicle conditions which need to be met before the fuel to the engine is adjusted. Some of these are discussed in detail below in conjunction with FIGS. 3A and 3B.

Although the method illustrated in FIG. 2 may be used to provide more or less fuel to an engine, such as the engine 12 shown in FIG. 1, and further may be used under any of a variety of vehicle operating conditions, one particular use is illustrated in FIGS. 3A and 3B. FIGS. 3A and 3B show a schematic representation of the present invention used to selectively adjust the amount of fuel provided to an engine during a transient startup period. This application of the invention may be particularly useful when a vehicle has been configured for low tail pipe emissions. This is because such a configuration may be based on a near stoichiometric A/F using nominal fuel. Because there is variation in the quality of fuel obtained at a fuel pump, an engine that has been calibrated with nominal fuel may not perform as expected. One problem that may be encountered is that the A/F is too lean, which may cause hesitation in the engine. As illustrated in FIGS. 3A and 3B, the present invention may be used to help compensate for variations in fuel quality.

In particular, FIGS. 3A and 3B illustrate how the present invention can be used to provide additional fuel to an engine when it experiences hesitation based on an A/F that is too lean during a transient startup period. As shown in FIG. 3A, a determination is made at decision block 72 as to whether certain predetermined conditions are met. As discussed above in conjunction with FIG. 2, the fuel to the engine 12 is not adjusted unless the engine torque error is greater than a predetermined amount. In addition, it was noted that other predetermined conditions could be used as criteria to determine whether the engine fuel should be adjusted. FIG. 3A shows one such example.

Because the method illustrated in FIG. 3A is particularly concerned with transient engine conditions at or near startup, one or more predetermined conditions can be examined to ensure that the vehicle engine is in this state. For example, the time since the engine was started can be compared to some predetermined time, and if the time since engine start is below this predetermined time, the condition is met. Similarly, another criterion could be that the position of a throttle is less than some predetermined throttle position. This may help to avoid over fueling if the driver demands a fast acceleration. Other predetermined conditions could include such things as a coolant temperature of the engine being below some predetermined temperature and/or the temperature of the coolant being stable. These criteria help to ensure that the engine is still in a transient startup mode. Moreover, the state of the engine can be examined to ensure that it is not in a crank mode, since the engine speed may vary significantly during this period. Of course, not all of these predetermined conditions need to be examined, or alternatively, additional predetermined conditions may be used instead of, or in conjunction with, those listed above.

As noted above, the method illustrated in FIG. 3A is specifically configured to provide additional fuel to an engine during a transient startup period. This method complements a closed loop fuel control system which may, for example, utilize an $O_2$ sensor to measure oxygen concentration in the vehicle exhaust gases. Such a closed loop system may not provide accurate information directly after the engine is started, and thus the present invention provides an improvement over fuel control systems utilizing only closed loop control. Of course, the present invention may be utilized in conjunction with other types of fuel control systems, closed loop or open loop, or alternatively, may provide the exclusive mechanism for fuel control in a vehicle. Thus, the present invention may be used to provide additional fuel to an engine having an A/F that is too lean, and may also be used to reduce the amount of fuel to an engine having an A/F that is too rich.

Returning to FIG. 3A, it is shown that if the predetermined conditions are not met, the fuel control system ends its routine at step 74. Using the vehicle 10 shown in FIG. 1 for reference, it is contemplated that the method illustrated in FIG. 3A will be programmed into the VSC/PCM 51. Because the VSC/PCM 51 communicates with other controllers and devices over the CAN 52, the method may reside in a different controller, either as a separate hardware device, or as software embedded in an existing controller. Returning to decision block 72, if the predetermined conditions are met, a fuel control algorithm is started—see step 76. The next step is to determine a first adjustment factor, so that if necessary, the amount of fuel to the engine 12 can be adjusted.

In the diagram shown in FIG. 3A, the first adjustment factor is an instantaneous hesitation factor (IHF), that provides an indication of whether the A/F for the engine 12 is too lean, which could cause the engine 12 to hesitate. As shown in FIG. 3A, determination of the IHF involves a number of steps. For example, at step 78, a probability is determined as to whether there is hesitation fuel present in the engine 12. As discussed above, the A/F for the engine 12 may be based on a calibration using nominal fuel. Thus, fuel obtained at a fuel pump may be provided to the engine 12 at the calibrated quantity, and yet the A/F for the engine 12 may still be too lean. The determination at step 78 provides an indication of the quality of the fuel being provided to the engine 12.

As shown in FIG. 3A, the probability determination at step 78 utilizes the transaxle engine torque, the determination of which was described above. In particular, the command to the generator 14 will indicate an amount of torque that the generator 14 needs to provide to the engine 12 to maintain the desired engine speed. This value is an indicator of both a torque error and the actual engine torque. Because it is determined using the transaxle 48, and in particular the generator 14, it is shown in FIG. 3A as the transaxle engine torque. The probability of hesitation fuel being present in the engine 12 is a number ranging from zero to one, inclusive. For example, if the transaxle engine torque is very close to the desired engine torque—i.e., the engine torque error is close to zero—the probability of hesitation fuel being present may be set to zero. This helps to ensure that the amount of fuel to the engine 12 will not be adjusted for very small differences between the desired engine output and the actual engine output.

If it is determined that the transaxle engine torque differs from the desired engine torque by more than a predetermined amount, the probability will be assigned some fractional value related to how much of a difference there is between the desired engine torque and the transaxle engine torque. If the difference is large enough, the probability will be set to one. The probabilities that are determined at step 78 can be provided to the VSC/PCM 51 in the form of a lookup table or by some other mechanism for relating the transaxle engine torque to the probability—e.g., a mathematical formula.

It is worth noting that the determination of the probability of hesitation fuel being present may be dependent on other factors besides the transaxle engine torque. For example, the coolant temp may be used to help determine the probability, since a higher engine coolant temp would indicate less of a need to add more fuel to the engine. In addition to the probability determined at step 78, a load modifier is also determined at step 80. The load modifier is a number that is based on the engine load, which is directly related to the position of the throttle 53. The load modifier shown in FIG. 3A is a positive number that will be multiplied by the probability of hesitation fuel being present, and this product will be used to determine the IHF. The load modifier may be determined by relating the engine load to a corresponding load modifier number in a lookup table, or some mathematical relationship can be programmed into a controller, such as the VSC/PCM 51. Thus, as the engine load increases, so does the load modifier. The use of the load modifier helps to compensate for higher engine loads, where hesitation caused by a lean A/F could be more problematic.

After the probability of hesitation fuel being present is determined at step 78, and the load modifier is determined at step 80, the product of these two terms is output to a limiting function 82. The purpose of the limiting function 82 is to ensure that the IHF never exceeds one. Thus, if the product of the probability of hesitation fuel being present and the load modifier is less than one, this value will pass through the limiting function 82 and will be the IHF. If, however, the load modifier is large enough, the product of the load modifier and the probability of hesitation fuel being present may be greater than one. In such a case, the limiting function 82 limits this value, so that the IHF is set to one. Thus, in the embodiment shown in FIG. 3A, the IHF will either be zero, or some positive value less than or equal to one.

When the IHF is zero, the fuel provided to the engine 12 will not be adjusted; however, when the IHF is some positive value, the fuel provided to the engine 12 will be increased based on the IHF number. As noted above, the present invention can also be used to reduce the amount of fuel provided to an engine when the A/F for the engine is too rich. For example, a sign changing function (not shown) can be included in the calculation of the IHF. In such a case, the IHF would be used to increase the fuel provided to the engine when it was a positive value, and would be used to reduce the amount of fuel provided to the engine when it was a negative value. Such a sign changing function would be implemented when the transaxle engine torque was greater than the desired engine torque.

In practice, the method shown in FIG. 3A may be performed in a loop, such that the various steps are repeated at some predetermined interval of time so that the IHF is updated. The first time the steps shown in FIG. 3A are implemented, the IHF may be used directly to adjust the amount of fuel provided to the engine 12. At the predetermined intervals, the IHF can then be updated, and compared to previous values of the IHF, which, because they are no longer representative of an instantaneous status, may be referred to simply as a hesitation factor (HF). FIG. 3B shows the steps that occur upon updating the IHF value. For example, an IHF value is now the input; this IHF value may represent a second adjustment factor. At decision block 84, it is determined whether the second adjustment factor is greater than the first adjustment factor—i.e., whether the IHF is greater than the HF. If the answer is yes, the HF is "filtered up" to a value at or near that of the IHF—see step 86. If, however, it is determined at decision block 84 that the IHF is not greater than the HF, the HF is "filtered down" to a value that is at or near the IHF—see step 88. The final output is a new HF value that will be used to further adjust the fuel provided to the engine 12.

The determination of new values for the IHF, and subsequent adjustments to previous values of the IHF—i.e., filtering the HF up or down—may continue as long as the appropriate predetermined conditions are met. As noted above, the present invention can be used to control the fuel provided to the engine throughout the operation of the vehicle, or alternatively, can be used only when the vehicle is operating under certain conditions, such as a transient engine startup state.

While the best mode for carrying out the invention has been described in detail, those familiar with the art to which this invention relates will recognize various alternative designs and embodiments for practicing the invention as defined by the following claims.

The invention claimed is:

1. A method for operating an engine in a vehicle, the vehicle including an electric machine operatively connected to the engine and capable of producing torque and controlling a speed of the engine, the method comprising:
    providing an amount of fuel to the engine based at least in part on a desired output of the engine;
    commanding the electric machine to control the engine speed based at least in part on the desired engine output;
    determining an output error of the engine based at least in part on the command to the electric machine, the engine output error being defined as a difference between the desired engine output and a determined engine output; and
    adjusting at least one engine parameter to reduce the engine output error when at least one predetermined condition is met.

2. The method of claim 1, the engine being a spark ignition engine, and wherein the at least one engine parameter includes a spark timing.

3. The method of claim 1, the engine being a diesel engine, and wherein the at least one engine parameter includes a fuel injection timing.

4. The method of claim 1, wherein the at least one engine parameter includes the amount of fuel provided to the engine.

5. The method of claim 4, the vehicle further including a throttle, wherein the at least one predetermined condition further includes at least one of the engine output error being greater than a predetermined amount, a time since engine start being below a predetermined time, a position of the throttle being less than a predetermined throttle position, an engine coolant temperature being stable, and the engine not being in a crank mode.

6. The method of claim 5, wherein the desired engine output is a desired engine torque, and the engine output error is an engine torque error.

7. The method of claim 6, further comprising:
determining a first adjustment factor for adjusting the amount of fuel provided to the engine, the first adjustment factor being based at least in part on the engine torque error; and
applying the first adjustment factor to the amount of fuel provided to the engine, thereby increasing the amount of fuel provided to the engine when the first adjustment factor is positive, and reducing the amount of fuel provided to the engine when the first adjustment factor is negative.

8. The method of claim 7, wherein the first adjustment factor is based in part on a load modifier related to a load on the engine.

9. The method of claim 8, the vehicle further including a throttle, and wherein the load modifier is based on a position of the throttle.

10. The method of claim 9, further comprising:
updating the engine torque error;
determining a second adjustment factor based at least in part on the updated engine torque error; and
adjusting the amount of fuel provided to the engine when the second adjustment factor differs from the first adjustment factor by more than a predetermined number.

11. The method of claim 1, further comprising determining an amount of torque output by the electric machine as it controls the engine speed, and
wherein the desired engine output is a desired engine torque, and the engine output error is an engine torque error, the engine torque error being defined as an amount of torque equal to the torque output by the electric machine as it controls the engine speed.

12. A method for operating an engine in a vehicle, the vehicle including an electric machine operatively connected to the engine and capable of producing torque and controlling a speed of the engine, the method comprising:
determining a desired torque for the engine based at least in part on a driver input;
providing an amount of fuel to the engine based at least in part on the desired torque;
determining a desired speed for the engine based at least in part on the driver input;
commanding the electric machine to control the speed of the engine based at least in part on the desired speed;
determining whether at least one predetermined vehicle condition is met;
determining a torque for the engine based at least in part on the command to the electric machine;
determining an engine torque error defined as a difference between the desired torque and the determined torque; and
adjusting the amount of fuel provided to the engine when the engine torque error is greater than a predetermined amount, and when the at least one predetermined condition is met.

13. The method of claim 12, the vehicle further including a throttle, and wherein the at least one predetermined condition includes at least one of a time since engine start being below a predetermined time, a position of the throttle being less than a predetermined throttle position, an engine coolant temperature being stable, and the engine not being in a crank mode.

14. The method of claim 12, further comprising determining an adjustment factor for adjusting the amount of fuel provided to the engine, the adjustment factor being based at least in part on the torque error; and
applying the adjustment factor to the amount of fuel provided to the engine, thereby increasing the amount of fuel provided to the engine when the adjustment factor is positive, and reducing the amount of fuel provided to the engine when the adjustment factor is negative.

15. The method of claim 14, further comprising:
determining additional engine torque errors over time based at least in part on additional commands to the electric machine;
determining additional adjustment factors based at least in part on corresponding additional torque errors;
adjusting the amount of fuel provided to the engine when one of the adjustment factors differs from an immediately preceding adjustment factor by more than a predetermined number.

16. The method of claim 15, wherein each of the adjustment factors is based in part on a corresponding load modifier related to a load on the engine.

17. The method of claim 16, the vehicle further including a throttle, and wherein each of the load modifiers is based on a corresponding throttle position.

18. A vehicle having an engine and a control system for operating the engine, the vehicle comprising:
an electric machine operatively connected to the engine and capable of controlling a speed of producing torque and the engine; and
at least one controller configured to determine a desired output of the engine, provide an amount of fuel to the engine based at least in part on the desired engine output, command the electric machine to control the engine speed based at least in part on the desired engine output, determine an output error of the engine based at least in part on the command to the electric machine, and adjust at least one engine parameter to reduce the engine output error when at least one predetermined condition is met.

19. The vehicle of claim 18, wherein the engine is a spark ignition engine, and the at least one engine parameter includes a spark timing.

20. The vehicle of claim 18, wherein the engine is a diesel engine, and the at lease one engine parameter includes a fuel injection timing.

21. The vehicle of claim 18, wherein the engine parameter includes the amount of fuel provided to the engine.

22. The vehicle of claim 21, further comprising a throttle, and wherein the at least one predetermined condition further includes at least one of a time since engine start being below a predetermined time, a position of the throttle being less than a predetermined throttle position, an engine coolant temperature being stable, and the engine not being in a crank mode.

23. The vehicle of claim 22, wherein the desired output of the engine is a desired engine torque, and the engine output error is an engine torque error.

24. The vehicle of claim 23, wherein the at least one controller is further configured to determine a first adjustment factor for adjusting the amount of fuel provided to the engine, the first adjustment factor being based at least in part on the engine torque error; and
apply the first adjustment factor to the amount of fuel provided to the engine, thereby increasing the amount of fuel provided to the engine when the first adjustment factor is positive, and reducing the amount of fuel provided to the engine when the first adjustment factor is negative.

25. The vehicle of claim 24, wherein the first adjustment factor is based in part on a load modifier related to a load on the engine.

26. The vehicle of claim 25, further comprising a throttle, and wherein the load modifier is based on a position of the throttle.

27. The vehicle of claim 26, wherein the at least one controller is further configured to update the engine torque error, determine a second adjustment factor based at least in part on the updated engine torque error, and adjust the amount of fuel provided to the engine when the second adjustment factor differs from the first adjustment factor by more than a predetermined number.

* * * * *